United States Patent
Han et al.

(10) Patent No.: US 8,706,156 B2
(45) Date of Patent: Apr. 22, 2014

(54) APPARATUS AND METHOD FOR MANAGING NEIGHBOR LIST IN BROADBAND WIRELESS COMMUNICATION SYSTEM

(75) Inventors: Ki-Young Han, Yongin-si (KR); In-Seok Hwang, Seoul-si (KR); Yon-Woo Yoon, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1236 days.

(21) Appl. No.: 12/215,077

(22) Filed: Jun. 25, 2008

(65) Prior Publication Data

US 2009/0005030 A1 Jan. 1, 2009

(30) Foreign Application Priority Data

Jun. 28, 2007 (KR) .......................... 10-2007-0064106

(51) Int. Cl.
*H04W 52/00* (2009.01)

(52) U.S. Cl.
USPC .............................. 455/525; 455/436; 370/331

(58) Field of Classification Search
USPC .................................. 455/436, 525; 370/331
See application file for complete search history.

(56) References Cited

U.S. PATENT DOCUMENTS

| | | | |
|---|---|---|---|
| 5,966,657 A * | 10/1999 | Sporre ........................ | 455/425 |
| 6,330,450 B1 * | 12/2001 | Wallstedt et al. ........... | 455/447 |
| 6,466,793 B1 * | 10/2002 | Wallstedt et al. ........... | 455/450 |
| 7,912,113 B2 * | 3/2011 | Sayana et al. ................ | 375/142 |
| 2001/0006892 A1 * | 7/2001 | Barnett et al. ................ | 455/434 |
| 2002/0128014 A1 * | 9/2002 | Chen .............................. | 455/447 |
| 2002/0191560 A1 * | 12/2002 | Chen et al. .................... | 370/331 |
| 2004/0185852 A1 * | 9/2004 | Son et al. ...................... | 455/438 |
| 2004/0244048 A1 * | 12/2004 | Wada et al. ................... | 725/120 |
| 2005/0111410 A1 * | 5/2005 | Bazar ............................ | 370/331 |
| 2006/0009228 A1 * | 1/2006 | Kang et al. ................... | 455/450 |
| 2006/0111111 A1 * | 5/2006 | Ovadia .......................... | 455/439 |
| 2007/0010251 A1 * | 1/2007 | Cho et al. ..................... | 455/436 |
| 2007/0037576 A1 * | 2/2007 | Subramanian et al. ....... | 455/436 |
| 2007/0213086 A1 * | 9/2007 | Claussen et al. ............. | 455/513 |
| 2007/0249353 A1 * | 10/2007 | Kang et al. ................... | 455/436 |
| 2007/0291692 A1 * | 12/2007 | Choi et al. .................... | 370/330 |
| 2008/0049678 A1 * | 2/2008 | Chindapol et al. ........... | 370/331 |
| 2008/0318576 A1 * | 12/2008 | So et al. ........................ | 455/436 |
| 2009/0092178 A1 * | 4/2009 | Sayana et al. ................ | 375/227 |
| 2009/0279504 A1 * | 11/2009 | Chin et al. .................... | 370/331 |
| 2009/0323512 A1 * | 12/2009 | Murali et al. ................. | 370/210 |
| 2010/0029279 A1 * | 2/2010 | Lee et al. ...................... | 455/436 |
| 2010/0203858 A1 * | 8/2010 | Lee et al. ...................... | 455/273 |
| 2011/0002295 A1 * | 1/2011 | Ghosal et al. ................ | 370/331 |
| 2011/0003594 A1 * | 1/2011 | Cooper ......................... | 455/436 |
| 2011/0047029 A1 * | 2/2011 | Nair et al. .................. | 705/14.52 |
| 2012/0243627 A1 * | 9/2012 | Wu et al. ...................... | 375/260 |
| 2013/0022160 A1 * | 1/2013 | Lee et al. ...................... | 375/346 |
| 2013/0095819 A1 * | 4/2013 | Cheng et al. ................. | 455/424 |

FOREIGN PATENT DOCUMENTS

| KR | 10-0617592 | 8/2006 |
|---|---|---|
| KR | 10-0617593 | 8/2006 |

* cited by examiner

*Primary Examiner* — Bobbak Safaipour

(57) ABSTRACT

Provided is an apparatus and method for managing a neighbor list in a broadband wireless communication system. In the method, a user terminal generates a CINR list through initial cell scanning to transmit the generated CINR list to a base station. The base station transmits the CINR list to a server. The server updates a neighbor list of the base station on the basis of the CINR list.

16 Claims, 9 Drawing Sheets

APPARATUS AND METHOD FOR MANAGING NEIGHBOR LIST IN BROADBAND WIRELESS COMMUNICATION SYSTEM

CROSS-REFERENCE TO RELATED APPLICATION(S) AND CLAIM OF PRIORITY

The present application claims priority under 35 U.S.C. §119(a) to an application filed in the Korean Intellectual Property Office on Jun. 28, 2007 and assigned Serial No. 2007-64106, the contents of which are incorporated herein by reference.

TECHNICAL FIELD OF THE INVENTION

The present invention relates generally to a broadband wireless communication system, and in particular, to an apparatus and method for managing a list of neighbor base stations (BSs) (hereinafter referred to as a neighbor list) in a broadband wireless communication system by using an initial cell search result of a user terminal.

BACKGROUND OF THE INVENTION

In general, a mobile communication system supports a handover for providing a seamless service, and a user terminal must have information about a handover target cell before the handover. In the 3rd Generation Partnership Project (3GPP) system, a user terminal can obtain information about a handover target cell before the handover by directly scanning neighbor cells in a periodic manner. In the Institute of Electrical and Electronics Engineers (IEEE) 802.16 system, a user terminal can obtain information about a handover target cell before the handover by receiving a neighbor list indicating information about neighbor BSs from a base station.

In the case of using the direct scanning operation, the user terminal does not obtain information about which neighbor BSs are present beforehand. In this case, the user terminal must scan all Frequency Allocations (FAs) and Cell_Idenfitiers (Cell_IDs) and must perform the scanning operation in a periodic manner, thus increasing the computational complexity of the user terminal.

In the case of using a neighbor list received from a base station, the user terminal scans only a base station included in the received neighbor list without the need to periodically scan neighbor BSs, thereby reducing the time required to perform the scanning operation.

However, the method based on the neighbor list cannot automatically update the neighbor list if the wireless channel environment of the base station changes due to the addition of neighbor BSs or FAs. Also, if a base station is initially omitted in generating a neighbor list, the user terminal cannot perform a handover to the omitted base station because the omission cannot be automatically corrected. If the base station generates and transmits a neighbor list, from which a neighbor BS is initially omitted, to the user terminal, it is impossible to perform an update on the omitted neighbor BS because the user terminal only scans base stations present in the neighbor list to report the scanning result to the base station.

There is, therefore, a need in the art for techniques to automatically update the neighbor list.

SUMMARY OF THE INVENTION

To address the above-discussed deficiencies of the prior art, it is a primary object of the present invention to substantially solve at least the above problems and/or disadvantages and to provide at least the advantages below. Accordingly, an object of the present invention is to provide an apparatus and method for managing a neighbor list in a broadband wireless communication system.

Another object of the present invention is to provide an apparatus and method for automatically updating a neighbor list in a broadband wireless communication system by using an initial cell search result of a user terminal.

According to an aspect of the present invention, a method of operating a user terminal for managing a neighbor list in a broadband wireless communication system includes: generating a CINR list through initial cell scanning; and transmitting a registration request message including the CINR list to a base station in order to update a neighbor list.

According to another aspect of the present invention, a method of operating a base station for managing a neighbor list in a broadband wireless communication system includes: transmitting a CINR list, received from a user terminal through a registration request message, to a server; and receiving a neighbor list, updated on the basis of the CINR list, from the server and transmitting the received neighbor list to the user terminal.

According to another aspect of the present invention, a method for an operation of a server for managing a neighbor list in a broadband wireless communication system includes: receiving a CINR list, obtained from an initial cell scanning operation by a user terminal, through a base station; and updating a neighbor list of the base station on the basis of the received CINR list and a prestored CINR list.

According to another aspect of the present invention, an apparatus of a user terminal for managing a neighbor list in a broadband wireless communication system includes: a wireless communicator for performing a cell scanning operation and transmitting a registration request message including a CINR list to a base station in order to update a neighbor list; and a list generator for generating the CINR list using information collected through the initial cell scanning operation.

According to another aspect of the present invention, an apparatus of a base station for managing a neighbor list in a broadband wireless communication system includes: a wireless communicator for receiving a registration request message including a CINR list from a user terminal and transmitting a neighbor list to the user terminal; and a wired communicator for transmitting the neighbor list to a server and receiving a neighbor list, updated on the basis of the CINR list, from the server.

According to another aspect of the present invention, an apparatus of a server for managing a neighbor list in a broadband wireless communication system includes: a wired communicator for receiving a CINR list, obtained from an initial cell scanning operation by a user terminal, through a base station; and a list updater for updating a neighbor list of the base station on the basis of the received CINR list and a prestored CINR list.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller"

means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication systems.

The present invention is intended to provide a system for automatically updating a neighbor list in a broadband wireless communication system by using an initial cell search result of a user terminal.

Figure 1:
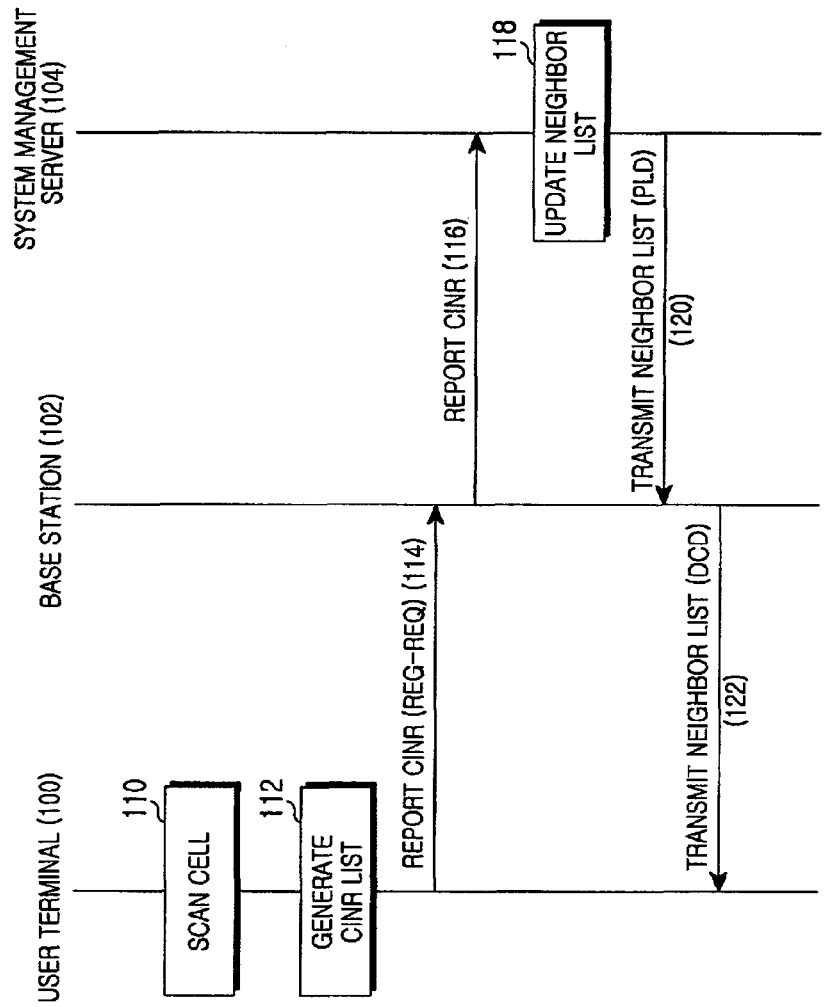
FIG. 1 is a flow diagram illustrating a signal flow for managing a neighbor list in a broadband wireless communication system according to the present invention.

FIG. 1 is a flow diagram illustrating a signal flow for managing a neighbor list in a broadband wireless communication system according to the present invention.

Referring to FIG. 1, if a user terminal 100 powers on, drops a call, or wakes up from an idle mode, the user terminal 100 enters a mode for scanning all Frequency Allocations (FAs) and Cell_Identifiers (Cell_IDs), in step 110. In step 112, the user terminal 100 estimates Carrier-to-Interference and Noise Ratios (CINRs) for neighbor base stations through the scanning operation to generate a CINR list. Herein, the user terminal 100 selects the FA having the largest power among all the FAs, selects a segment having the largest power among segments corresponding to the selected FA, and selects the Cell_ID having the largest correlation value from the selected segment, thereby determining a serving base station (BS). Also, the user terminal 100 constructs the CINR list for cells having a CINR value larger than a predetermined threshold value. At this point, the user terminal 100 does not estimate CINRs for Cell_IDs for all FAs and segments, but estimates a CINR for each Cell_ID for only FAs and segments having receive (RX) power larger than a predetermined reference value and compares the estimated CINR value with the predetermined threshold value.

In step 114, the user terminal 100 uses a registration request (REG-REQ) message to transmit the generated CINR list to a serving BS 102. Herein, the CINR list includes information about CINRS, FA indexes, and cell indexes (or preamble indexes).

Upon receiving the CINR list from the user terminal 100, the serving BS 102 transmits the received CINR list to a system management server 104 in step 116.

Upon receiving the CINR list from the serving BS 102, the system management server 104 uses the received CINR list to update a neighbor list of the serving BS 102 in step 118. In step 120, the system management server 104 uses Programmable Logging Data (PLD) to transmit the updated neighbor list to the serving BS 102.

Upon receiving the updated neighbor list from the system management system 104, the serving BS 102 uses a Downlink Channel Descriptor (DCD) to transmit the received neighbor list to the user terminal 100 in step 122.

Through the above process, the user terminal 100 receives the automatically updated neighbor list from the system management server 104 to manage a handover.

Figure 2:
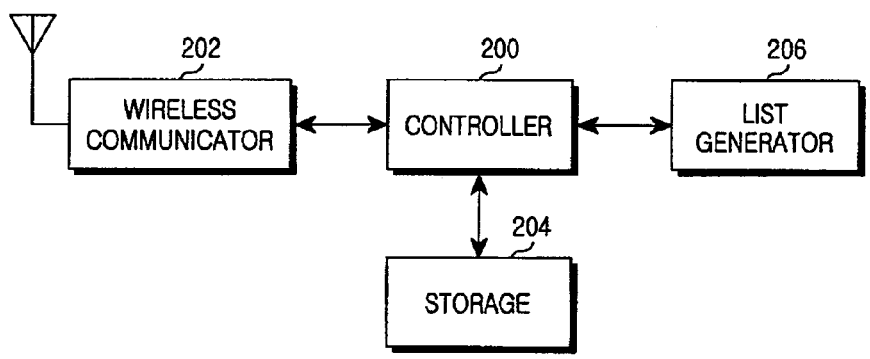
FIG. 2 is a block diagram of a user terminal in a broadband wireless communication system according to an embodiment of the present invention.

FIG. 2 is a block diagram of a user terminal in a broadband wireless communication system according to an embodiment of the present invention.

Referring to FIG. 2, the user terminal includes a controller 200, a wireless communicator 202, a storage 204, and a list generator 206.

The controller 200 controls and processes an overall operation of the user terminal. If the mobile terminal powers on, drops a call, or wakes up from an idle mode, the controller 200 controls an operation for scanning all FAs and Cell_IDs, and provides information, collected through the scanning operation, to the list generator 106. Also, the controller 200 controls an operation for transmitting a CINR list, generated by the list generator 106, to a serving BS using a REG-REQ message. In doing so, the controller 200 adds a Type Length Value (TLV) in the REG-REQ message in order to transmit the CINR list to the serving BS.

Table 1 shows an example of the TLV added in the REG-REQ message.

TABLE 1

| Type | Length in Bytes | Value |
| --- | --- | --- |
| xxx | 3/6/9/12 | FA Index (8 bits), Cell Index (Preamble Index) (8 bits), CINR (8 bits): unsigned with 0.5 dB. |

Table 1 shows a TLV for reporting four CINR values by 0.5 dB when the user terminal generates the CINR list including the four CINR values, where the TLV includes 8-bit FA indexes, 8-bit cell indexes, and 8-bit CINR values.

The controller 200 provides a neighbor list, received from a serving BS through the wireless communicator 202, to storage 204, and controls the scanning of neighbor BSs included in the neighbor list by the wireless communicator 202.

The wireless communicator 202 performs a signal processing operation for communicating with base stations through wireless resources. Also, under the control of the controller 200, the wireless communicator 202 scans all FAs and Cell_IDs or scans the neighbor BSs included in the neighbor list, and provides the scanned information to the controller 200.

On the basis of the scanned information received from the controller 200, the list generator 206 estimates CINRs for Cell_IDs to determine a serving BS, and generates a CINR list for cells having a CINR value larger than a predetermined threshold value. Herein, the CINR list includes information about CINRs, FA indexes, and cell indexes (or preamble indexes). Herein, the list generator 206 measures RX power for each FA to select the FA having the largest power, selects a segment having the largest power among the segments of the selected FA, and selects the Cell_ID having the largest correlation value among the Cell_IDs of the selected segment, thereby determining the serving BS.

Also, in order to generate the CINR list, the list generator 206 does not estimate CINRs for Cell_IDs for all FAs and segments, but estimates a CINR for each Cell_ID for only FAs and segments having RX power larger than a predetermined reference value and compares the estimated CINR value with the predetermined threshold value.

The storage 204 stores a variety of microcodes and programs for the overall operation of the user terminal, and stores the neighbor list received from the controller 200.

Figure 3:
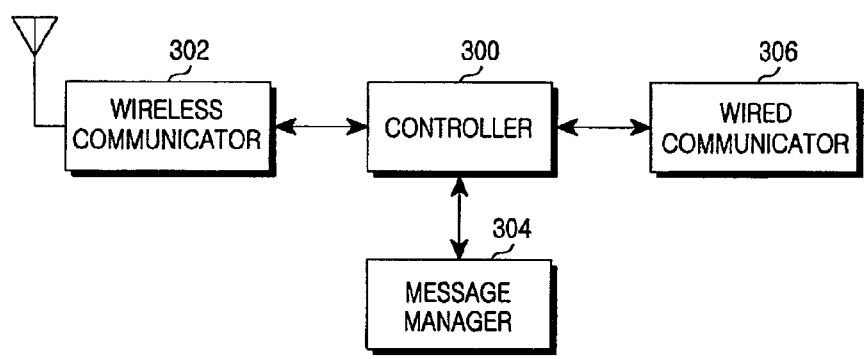
FIG. 3 is a block diagram of a base station in a broadband wireless communication system according to an embodiment of the present invention.

FIG. 3 is a block diagram of a base station in a broadband wireless communication system according to an embodiment of the present invention.

Referring to FIG. 3, the base station includes a controller 300, a wireless communicator 302, a message manager 304, and a wired communicator 306.

The controller 300 controls and processes an overall operation of the base station. The controller 300 controls an operation for providing a CINR list, received from a user terminal through the wireless communicator 302, to the wired communicator 306 to transmit the CINR list to a system management server. Also, the controller 300 controls an operation for transmitting a neighbor list, received from the system management server through the wired communicator 306, to the user terminal through the wireless communicator 302.

The message manager 304 analyzes a REG-REQ message, received from the user terminal through the wireless communicator 302, to detect the CINR list. Also, the message manager 304 processes the CINR list into a message format for transmission to the system management server to provide the resulting information to the controller 300.

The wireless communicator 302 performs a signal processing operation for communicating with the user terminal through wireless resources. In performing this operation, the wireless communicator 320 processes a signal received from the user terminal to provide the resulting signal to the controller 300, and transmits a signal received from the controller 300 to the user terminal.

The wired communicator 306 performs a signal processing operation for exchanging information with the system management server. In performing this operation, the wired communicator 306 processes a signal received from the system management server to provide the resulting signal to the controller 300, and processes a signal received from the controller 300 to transmit the resulting signal to the system management server.

Figure 4:
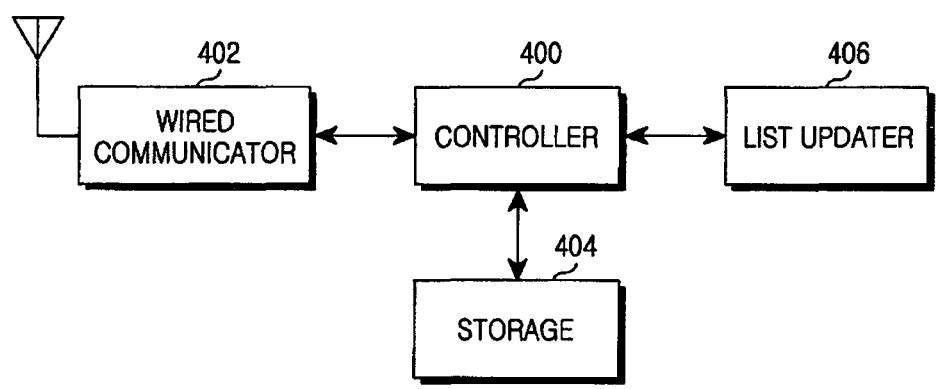
FIG. 4 is a block diagram of a system management server in a broadband wireless communication system according to an embodiment of the present invention.

FIG. 4 is a block diagram of a system management server in a broadband wireless communication system according to an embodiment of the present invention.

Referring to FIG. 4, the system management server includes a controller 400, a wired communicator 402, a storage 404, and a list updater 406.

The controller 400 controls and processes an overall operation of the system management server. Upon receiving a CINR list, generated by a user terminal covered by a base station, from the wired communicator 402, the controller 400 detects a neighbor list and a CINR list for the base station in the storage 404 to provide the detected list to the list updater 406. Also, the controller 400 provides a neighbor list, updated by the list updater 406, to the wired communicator 402 to transmit the updated neighbor list to the base station.

The wired communicator 402 performs a signal processing operation for exchanging information with the base station. In performing this operation, the wired communicator 402 processes a signal received from the base station to provide the resulting signal to the controller 400, and processes a signal received from the controller 400 to transmit the resulting signal to the base station.

The storage 404 stores a variety of microcodes and programs for the overall operation of the system management server, and stores a neighbor list and a CINR list for each BS.

The list updater 406 updates a neighbor list using the CINR list received through the controller 400 from the user terminal covered by the base station. In performing this operation, the list updater 406 generates a new CINR list by combining the CINR list received from the user terminal and the CINR list of the base station prestored in the storage 404. Thereafter, the list updater 406 determines whether each cell included in the new CINR list is included in the neighbor list of the base station. If the cell in the new CINR list is included in the neighbor list, the list updater 406 compares the CINR values of cells in the two lists to update the CINR value of the neighbor list. On the other hand, if the cell in the new CINR list is not included in the neighbor list, the list updater 406 performs an operation for updating the neighbor list according to whether the neighbor list includes a predetermined number of cells.

Figure 5A:
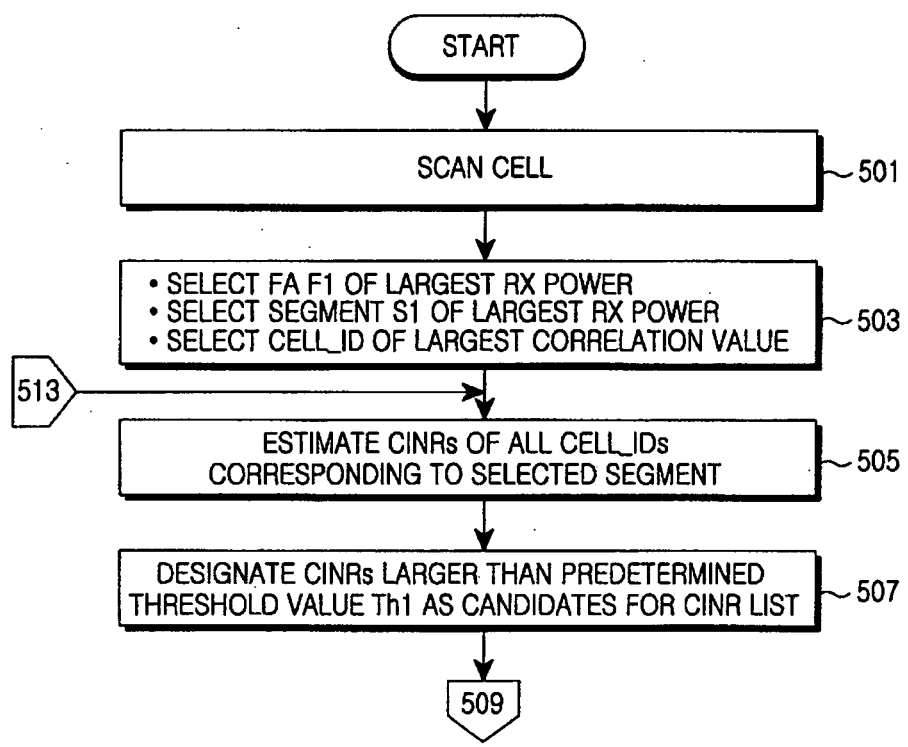
FIGS. 5A and 5B are flowcharts illustrating a process of an initial cell search operation by a user terminal for managing a neighbor list in a broadband wireless communication system according to an embodiment of the present invention.
Figure 5B:
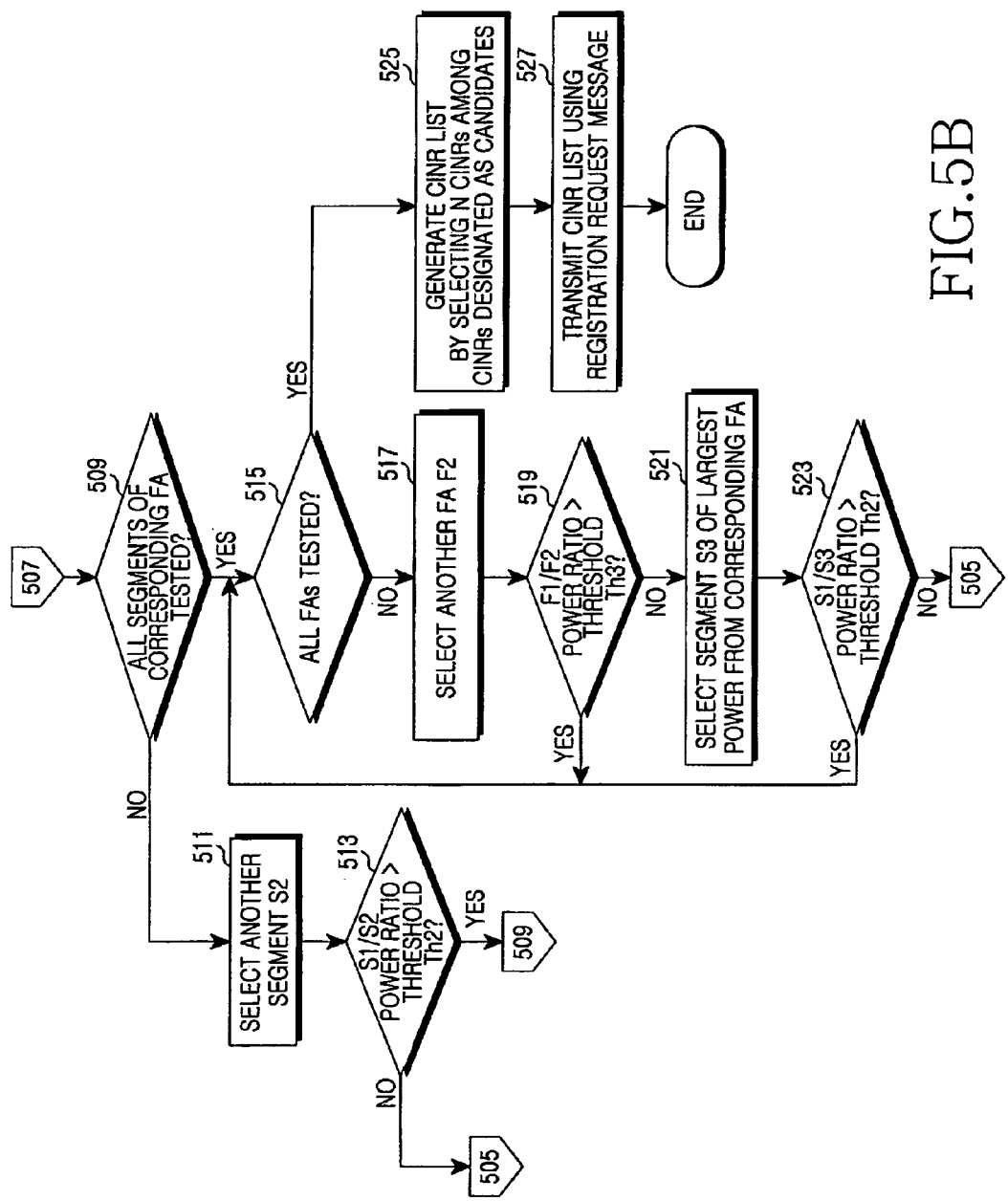

FIGS. 5A and 5B are flowcharts illustrating a process of an initial cell search operation of a user terminal for managing a neighbor list in a broadband wireless communication system according to an embodiment of the present invention.

Referring to FIGS. 5A and 5B, in step 501, the user terminal enters a mode for scanning all FAs and Cell_IDs. Herein, the user terminal enters the above scanning mode when the user terminal powers on, drops a call, or wakes up from an idle mode.

In step 503, the user terminal measures the RX power of each FA through the above scanning operation to select the FA F1 having the largest RX power, selects a segment S1 having the largest power among segments corresponding to the selected FA F1, and selects the Cell_ID having the largest correlation value from the selected segment S1, thereby determining its serving BS.

In step 505, the user terminal estimates the CINRs for all the Cell_IDs corresponding to the selected segment S1. In step 507, the user terminal designates cells having a CINR value larger than a predetermined threshold value Th1 as candidates for a CINR list, and stores the same temporarily.

In step 509, the user terminal determines whether a test was made to generate a CINR list for all the segments of the corresponding FA. If the test was not made on all the segments of the corresponding FA (in step 509), the process proceeds to step 511. In step 511, the user terminal selects another segment S2 that has not been selected up to now. In step 513, the user terminal compares an RX power ratio S1/S2 between the selected segment S1 and the selected segment S2 with a predetermined segment threshold value Th2.

If the S1/S2 RX power ratio is smaller than or equal to the predetermined segment threshold value Th2 (S1/S2≤Th2) (in step 513), i.e., if the RX power of the segment S2 is not smaller than the RX power of the segment S1 by a predetermined level or more, the process returns to step 505 so that the user terminal estimates CINRs for all the Cell_IDs corresponding to the selected segment S2 and again performs the subsequent steps.

If the S1/S2 RX power ratio is larger than the predetermined segment threshold value (S1/S2>Th2) (in step 513), i.e., if the RX power of the segment S2 is smaller than the RX power of the segment S1 by the predetermined level or more, the process returns to step 509 without estimating the CINRs for the Cell_IDs of the segment so that the user terminal again performs the subsequent steps by determining whether the test was made on all the segments of the corresponding FA.

If the test was made on all the segments of the corresponding FA (in step 509), the process proceeds to step 515. In step 515, the user terminal determines whether a test was made to generate a CINR list for all the FAs.

If the test was not made on all the FAs (in step 515), the process proceeds to step 517. In step 517, the user terminal selects another FA F2 that has not been selected up to now. In step 519, the user terminal compares an RX power ratio F1/F2 between the selected FA F1 and the selected FA F2 with a predetermined FA threshold value Th3.

If the F1/F2 RX power ratio is larger than the predetermined FA threshold value Th3 (F1/F2>Th3) (in step 519), i.e., if the RX power of the FA F2 is smaller than the RX power of the FA F1 by a predetermined level or more, the process returns to step 515 so that the user terminal again performs the subsequent steps by determining that a test not be made to generate a CINR list for the FA F2.

If the F1/F2 RX power ratio is smaller than or equal to the predetermined FA threshold value (F1/F2≤Th3) (in step 519), i.e., if the RX power of the FA F2 is not smaller than the RX power of the FA F1 by the predetermined level or more, the process proceeds to step 521. In step 521, the user terminal selects a segment S3 having the largest RX power from the FA F2. In step 523, the user terminal compares an RX power ratio S1/S3 between the selected segment S1 and the selected segment S3 with the predetermined segment threshold value Th2.

If the S1/S3 RX power ratio is larger than the predetermined segment threshold value Th2 (S1/S3>Th2) (in step 523), the process returns to step 515 so that the user terminal again performs the subsequent steps. If the S1/S3 RX power ratio is not larger than the predetermined segment threshold value Th2 (in step 523), the process returns to step 505 so that the user terminal estimates CINRs for all the Cell_IDs corresponding to the selected segment S3 and again performs the subsequent steps.

On the other hand, if the test was made on all the FAs (in step 515), the process proceeds to step 525. In step 525, the user terminal generates a CINR list by selecting an N number of CINRs among the prestored CINRs, which was designated as the candidates for the CINR list, in descending order of the CINR value.

In step 527, the user terminal adds a TLV, as shown in Table 1, to a registration request message and transmits the generated CINR list to the serving BS. Thereafter, the process is ended.

Figure 6:
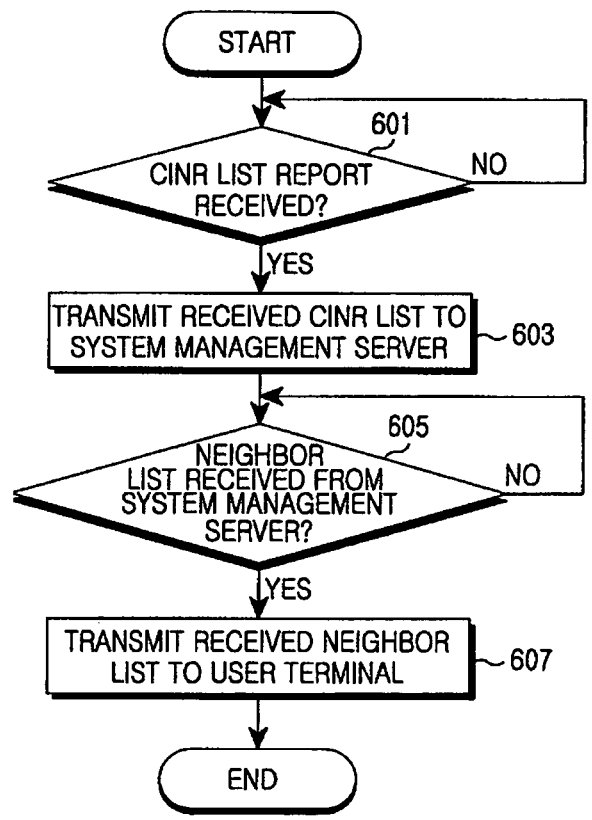
FIG. 6 is a flowchart illustrating a process of operating a base station for managing a neighbor list in a broadband wireless communication system according to an embodiment of the present invention.

FIG. 6 is a flowchart illustrating a process of operating a base station for managing a neighbor list in a broadband wireless communication system according to an embodiment of the present invention.

Referring to FIG. 6, upon receiving a CINR list from a user terminal through a registration request message in step 601, the base station transmits the received registration request message to a system management server in step 603.

Thereafter, upon receiving a neighbor list of neighbor BSs for handover from the system management server in step 605, the base station uses a DCD to transmit the received neighbor list to user terminals covered by the base station itself. Thereafter, the process is ended.

Figure 7A:
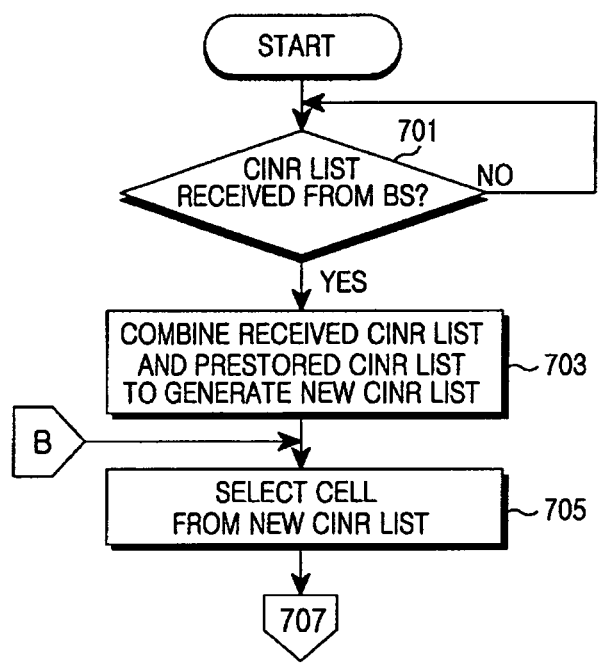
FIGS. 7A to 7C are flowcharts illustrating a process of operating a system management server for managing a neighbor list in a broadband wireless communication system according to an embodiment of the present invention.
Figure 7B:
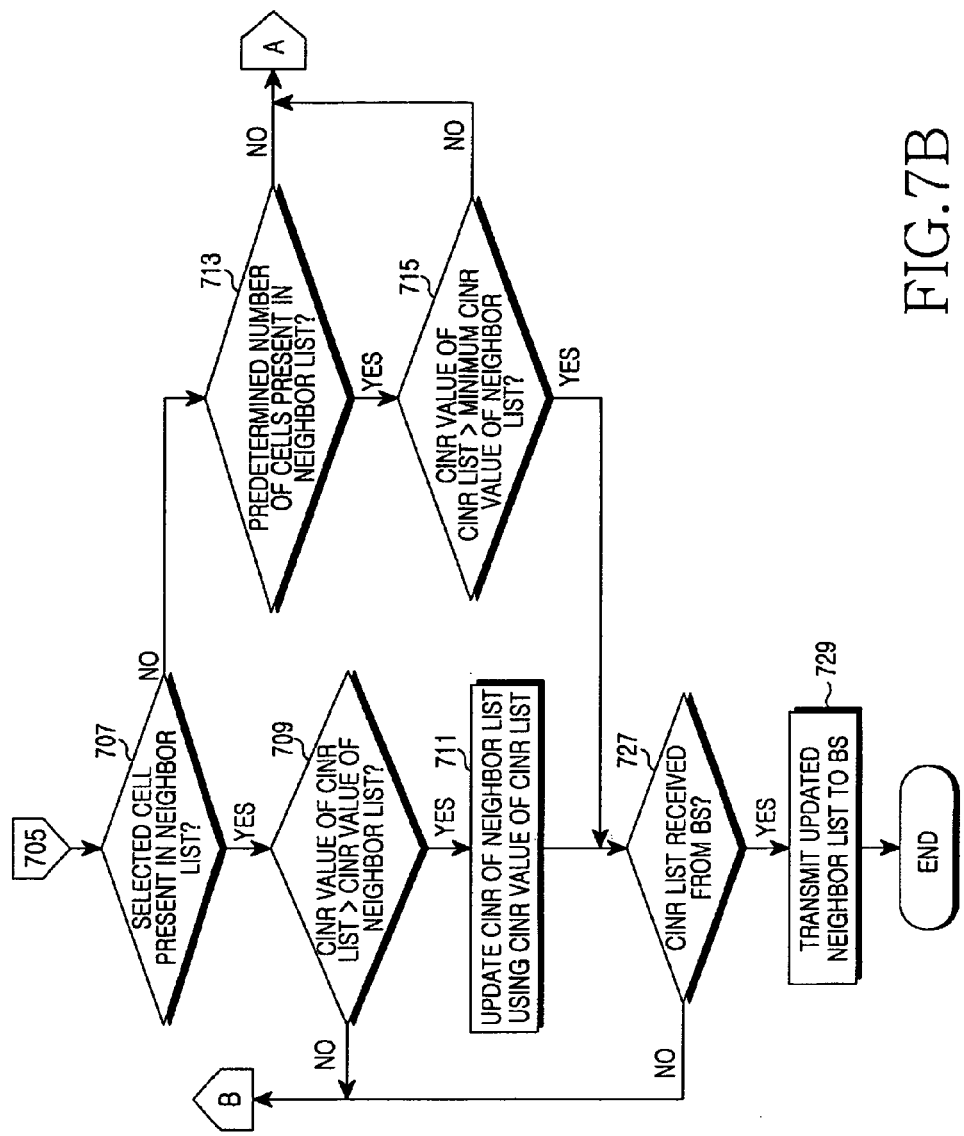
Figure 7C:
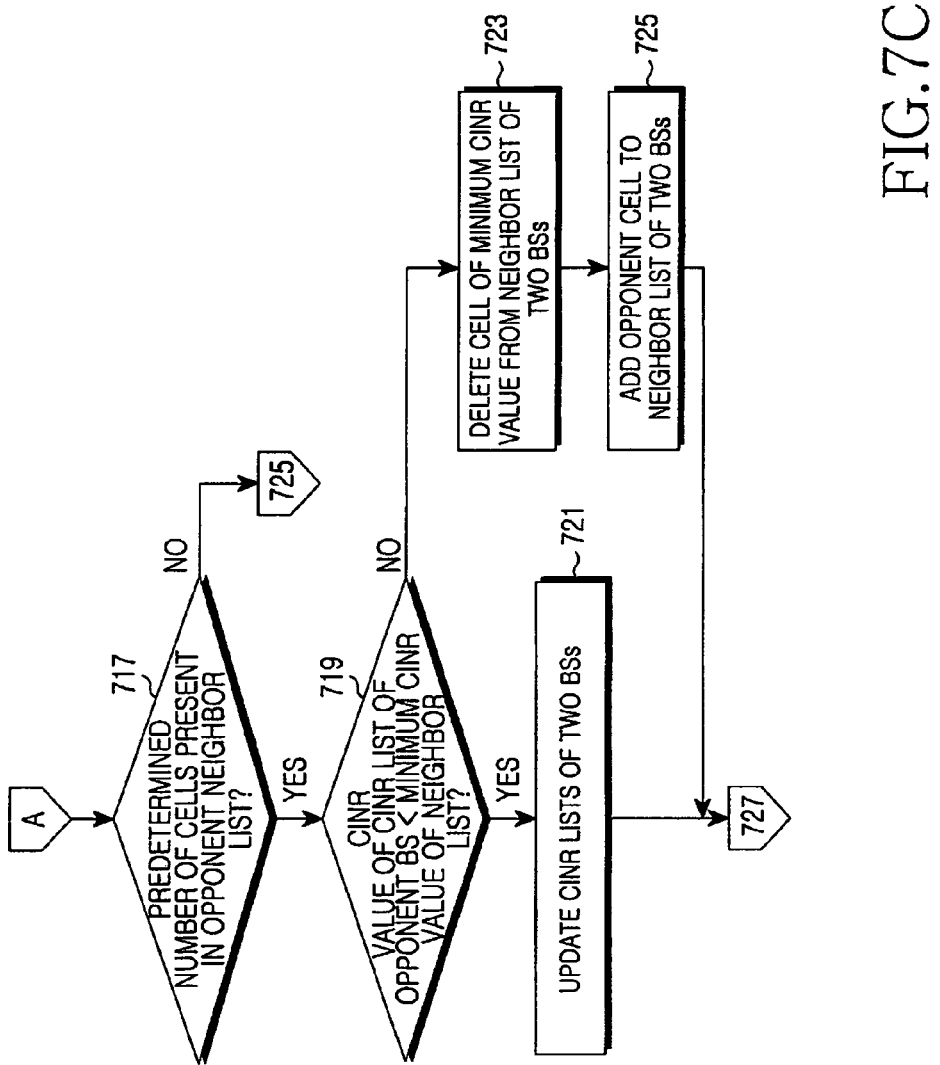

FIGS. 7A to 7C are flowcharts illustrating a process of operating a system management server for managing a neighbor list in a broadband wireless communication system according to an embodiment of the present invention.

Referring to FIGS. 7A to 7C, upon receiving a CINR list from a base station in step 701, the system management server combines the received CINR list and a CINR list for the base station among prestored CINR lists to generate a new CINR list in step 703.

In step 705, the system management server selects a cell from the new CINR list. In step 707, the system management server determines whether the selected cell is present in a neighbor list of the base station.

If the selected cell is present in the neighbor list (in step 707), the system management server compares a CINR value of the cell written in the CINR list with a CINR value of the cell written in the neighbor list in step 709. If the CINR value written in the CINR list is smaller than or equal to the CINR value written in the neighbor list (in step 709), the process returns to step 705 so that the system management server selects another cell from the CINR list to again perform the subsequent steps.

If the CINR value written in the CINR list is larger than the CINR value written in the neighbor list (in step 709), the process proceeds to step 711. In step 711, the system management server 711 updates the neighbor list by writing the CINR value of the CINR list as the CINR value of the cell of the neighbor list.

Thereafter, in step 727, the system management server determines whether a test on all cells of the CINR list is completed. If the test on all the cells of the CINR list is not completed (in step 727), the process returns to step 705 so that the system management server selects another cell from the CINR list to again perform the subsequent steps. On the other hand, if the test on all the cells of the CINR list is completed (in step 727), the process proceeds to step 729. In step 729, the system management server uses PLD to transmit the updated neighbor list to the base station. Thereafter, the process is ended.

If the selected cell is not present in the neighbor list (in step 707), the process proceeds to step 713. In step 713, the system management server determines whether a predetermined number of cells is present in the neighbor list.

If a predetermined number of cells is present in the neighbor list (in step 713), the system management server compares the CINR value of the cell with the minimum CINR value of the neighbor list. If the CINR value of the cell is smaller than the minimum CINR value of the neighbor list, the process proceeds to step 727 so that the system management server again performs the subsequent steps. On the other hand, if the CINR value of the cell is larger than or equal to the minimum CINR value of the neighbor list, the process proceeds to step 717.

If a predetermined number of cells is not present in the neighbor list (in step 713), the process proceeds to step 717. In step 717, the system management server determines whether a predetermined number of cells is already present in a neighbor list of an opponent BS, i.e., a neighbor list corresponding to the cell.

If a predetermined number of cells is not present in the neighbor list of the opponent BS (in step 717), the process proceeds to step 725. In step 725, the system management server adds an opponent cell to the neighbor list of the two BSs. Thereafter, the process proceeds to step 727 so that the system management server again performs the subsequent steps.

On the other hand, if a predetermined number of cells is present in the neighbor list of the opponent BS (in step 717), the process proceeds to step 719. In step 719, the system management server detects the CINR value of the base station from the CINR list for the opponent BS among the prestored CINR lists, detects the minimum CINR value from the neighbor list of the opponent BS, and compares the detected CINR values.

If the CINR value written in the CINR list is smaller than the minimum CINR value of the neighbor list (in step 719), the process proceeds to step 721. In step 721, the system management server updates the CINR lists of the two BSs. Thereafter, the process proceeds to step 727 so that the system management server again performs the subsequent steps.

On the other hand, if the CINR value written in the CINR list is not smaller than the minimum CINR value of the neighbor list (in step 719), the process proceeds to step 723. In step 723, the system management server deletes a cell having the minimum CINR value from the neighbor list of the two BSs. In step 725, the system management server adds an opponent cell to the neighbor list of the two BSs. Thereafter, the process proceeds to step 727 so that the system management server again performs the subsequent steps.

As described above, the present invention automatically updates the neighbor list at the system management server in the broadband wireless communication system on the basis of the initial cell search result by the user terminal, and transmits the updated neighbor list to the user terminal. Therefore, it is possible to automatically update the neighbor list even in case of a change in the wireless channel environment of the base station due to addition of FAs or neighbor BSs, while maintaining the advantage of the case of using the neighbor list.

Although the present disclosure has been described with an exemplary embodiments, various changes and modifications may be suggested to one skilled in the art. It is intended that the present disclosure encompass such changes and modifications as fall within the scope of the appended claims.

What is claimed is:

1. A method of operating a user terminal for managing a neighbor list in a wireless communication system, the method comprising:
   estimating Carrier-to-Interference and Noise Ratios (CINRs) for a plurality of cells;
   selecting at least one cell by comparing estimated CINRs with a predetermined threshold value;
   transmitting a message including a cell ID and an estimated CINR corresponding to the selected at least one cell; and
   receiving a neighbor list updated using the transmitted cell ID and the estimated CINR.

2. The method of claim 1, further comprising receiving the neighbor list from the base station through a Downlink Channel Descriptor (DCD).

3. The method of claim 1, wherein the CINRs for the plurality of cells is estimated when the user terminal powers on, drops a call, or wakes up from an idle mode.

4. The method of claim 1, wherein estimating the CINRs comprises:
   selecting at least one target cell to be estimated by comparing a predetermined power value with a receive (RX) power for at least one of a Frequency Allocation and a segment;
   estimating the CINR for the selected at least one target cell.

5. The method of claim 4, wherein selecting the at least one target cell comprises:
   selecting the FA having the largest RX power by measuring the RX power of each FA through scanning;
   selecting a segment having the largest RX power among segments of the selected FA; and
   selecting the at least one target cell by comparing the predetermined power value with the selected segment of the selected FA.

6. The method of claim 1, wherein the CINR list further comprises Frequency Allocation (FA) index.

7. A method of operating a base station for managing a neighbor list in a wireless communication system, the method comprising:
   receiving a registration request message including a Carrier-to-Interference and Noise Ratio (CINR) list generated in order to update a neighbor list from a user terminal;
   transmitting the CINR list to a server;
   receiving a neighbor list, updated on the basis of the CINR list, from the server; and
   transmitting the updated neighbor list to the user terminal.

8. The method of claim 7, wherein the CINR list comprises at least one of a Frequency Allocation (FA) index, a cell index, and CINR information.

9. An apparatus of a user terminal for managing a neighbor list in a wireless communication system, the apparatus comprising:
   a list generator configured to estimate Carrier-to-Interference and Noise Ratios (CINRs) for a plurality of cells through cell scanning, and select at least one cell by comparing estimated CINRs with a predetermined threshold value; and
   a wireless communicator configured to perform a cell scanning operation, transmit a message including a cell ID and an estimated CINR corresponding to the selected at least one cell, and receive a neighbor list updated using the transmitted cell ID and the estimated CINR.

10. The apparatus of claim 9, wherein the wireless communicator is configured to perform the cell scanning operation when the user terminal powers on, drops a call, or wakes up from an idle mode.

11. The apparatus of claim 9, wherein the list generator is configured to select at least one target cell to be estimated by comparing a predetermined power value with a receive (RX) power for at least one of a Frequency Allocation and a segment, and estimate the CINR for the selected at least one target cell.

12. The apparatus of claim 9, wherein the CINR list further comprises a Frequency Allocation (FA) index.

13. An apparatus of a base station for managing a neighbor list in a wireless communication system, the apparatus comprising:
   a wireless communicator configured to receive a registration request message including a Carrier-to-Interference and Noise Ratio (CINR) list generated in order to update a neighbor list from a user terminal and transmit a neighbor list to the user terminal; and a wired communicator configured to transmit the received CINR list to a server and receive the neighbor list, updated on the basis of the CINR list, from the server.

14. The apparatus of claim 13, wherein the CINR list comprises at least one of a Frequency Allocation (FA) index, a cell index, and CINR information.

15. The apparatus of claim 9, wherein the list generator is configured to select the FA having the largest RX power by measuring the RX power of each FA through scanning, select a segment having the largest RX power among segments of the selected FA, and select the at least one target cell by comparing the predetermined power value with the selected the segment of the selected FA.

16. The apparatus of claim 9, wherein the apparatus is configured to receive the neighbor list from the base station through a Downlink Channel Descriptor (DCD).

* * * * *